(12) United States Patent
Chernoff et al.

(10) Patent No.: US 7,287,614 B2
(45) Date of Patent: Oct. 30, 2007

(54) ENGINE COMPARTMENT COVER

(75) Inventors: Adrian B. Chernoff, Troy, MI (US); Richard M. Kleber, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 134 days.

(21) Appl. No.: 11/131,993

(22) Filed: May 18, 2005

(65) Prior Publication Data

US 2006/0260854 A1 Nov. 23, 2006

(51) Int. Cl.
*B62D 25/10* (2006.01)
*B62D 33/00* (2006.01)

(52) U.S. Cl. .................. 180/69.2; 180/69.24; 181/141; 296/39.3

(58) Field of Classification Search ............... 180/69.2, 180/69.24, 69.22; 296/39.3; 181/141; B60R 13/08
See application file for complete search history.

(56) References Cited

U.S. PATENT DOCUMENTS

| | | | | |
|---|---|---|---|---|
| 3,583,513 | A | * | 6/1971 | Macadam et al. ....... 180/69.24 |
| 5,040,628 | A | * | 8/1991 | Price ....................... 180/69.21 |
| 5,411,311 | A | * | 5/1995 | Shimmell et al. ...... 296/203.02 |
| 5,535,841 | A | * | 7/1996 | Cobes et al. ............... 180/69.2 |
| D396,478 | S | | 7/1998 | Hubbach ....................... D15/5 |
| 5,849,390 | A | * | 12/1998 | Dillon .......................... 428/99 |
| 5,950,753 | A | * | 9/1999 | Muldoon et al. .......... 180/68.1 |
| 6,167,976 | B1 | * | 1/2001 | O'Neill et al. ............. 180/69.2 |

\* cited by examiner

*Primary Examiner*—Christopher P. Ellis
*Assistant Examiner*—John R. Olszewski

(57) ABSTRACT

A vehicle includes a body defining an engine compartment and a plurality of vehicle frame members. An engine compartment cover defines a portion of the engine compartment and functions as a structural load-bearing portion of a vehicle frame by rigidly, structurally interconnecting vehicle frame members.

14 Claims, 2 Drawing Sheets

ENGINE COMPARTMENT COVER

TECHNICAL FIELD

The present invention relates to vehicular engine compartment covers that function as vehicle frame portions by structurally interconnecting vehicle frame members.

BACKGROUND OF THE INVENTION

Motor vehicle front ends typically have a plurality of structural load-bearing frame members. The load-bearing frame members partially form or surround an engine compartment used to house various vehicular components, including steering system components, braking system components, and propulsion system components.

The load-bearing frame members may be subjected to significant stresses. A suspension system with wheels is mounted with respect to at least some of the load-bearing frame members, and transfers loads to frame members. These loads are caused by forces encountered in regular vehicle operation: irregularities in the road exert a vertical force on wheels that are transmitted to frame members; forces related to the linear acceleration or deceleration of the vehicle relative to a road surface are transmitted from the wheels to frame members; and forces related to the lateral acceleration of the vehicle relative to the road surface are transmitted from the wheels to frame members. Furthermore, the vehicular components in the engine compartment are mounted to at least some of the load-bearing frame members, which therefore bear the weight of the vehicular components.

A hood is typically employed to conceal and protect the vehicular components in the engine compartment. The hood opens to provide access to the engine compartment for maintenance and repair of the powerplant and other components. In the prior art, the hood is fixed at only three points, via two hinges, usually placed at the rear of the hood at or near a cowl, and via a releasable latch located at or near an upper tie bar. These three connection points are not totally rigid which allows the conventional hood to pivot relative to the vehicle's body structure. The prior art hood is thus not suited for bearing loads from, or distributing loads among, structural load-bearing frame members in prior art motor vehicles.

SUMMARY OF THE INVENTION

A vehicle is provided that includes a vehicle body at least partially defining an engine compartment. The vehicle also includes a vehicle frame, which may or may not be integral with the body. The vehicle frame has a plurality of frame members, including a cross member and at least two rails mounted with respect to the cross member. A load-bearing, structural engine compartment cover defines at least a portion of the engine compartment and is rigidly mounted to at least two of the frame members so that the engine compartment cover is configured to transfer loads between the two frame members irrespective of load vector. The engine compartment cover thereby forms a portion of the vehicle frame by structurally interconnecting the two frame members. A hood is pivotably connected to the vehicle body for selective movement between an open position and a closed position in which the hood extends over the engine compartment and the engine compartment cover.

Because the engine compartment cover can distribute loads among frame members, each of the individual frame members carries less of a load than it would in a comparable vehicle without the engine compartment cover. A vehicle employing the structural load-bearing engine compartment cover may therefore have smaller or fewer load-bearing frame members than a comparable vehicle without the engine compartment cover. The engine compartment cover may also improve under-hood vehicle aesthetics.

The above features and advantages, and other features and advantages, of the present invention are readily apparent from the following detailed description of the best mode for carrying out the invention when taken in connection with the accompanying drawings.

DESCRIPTION OF THE PREFERRED EMBODIMENT

Figure 1:
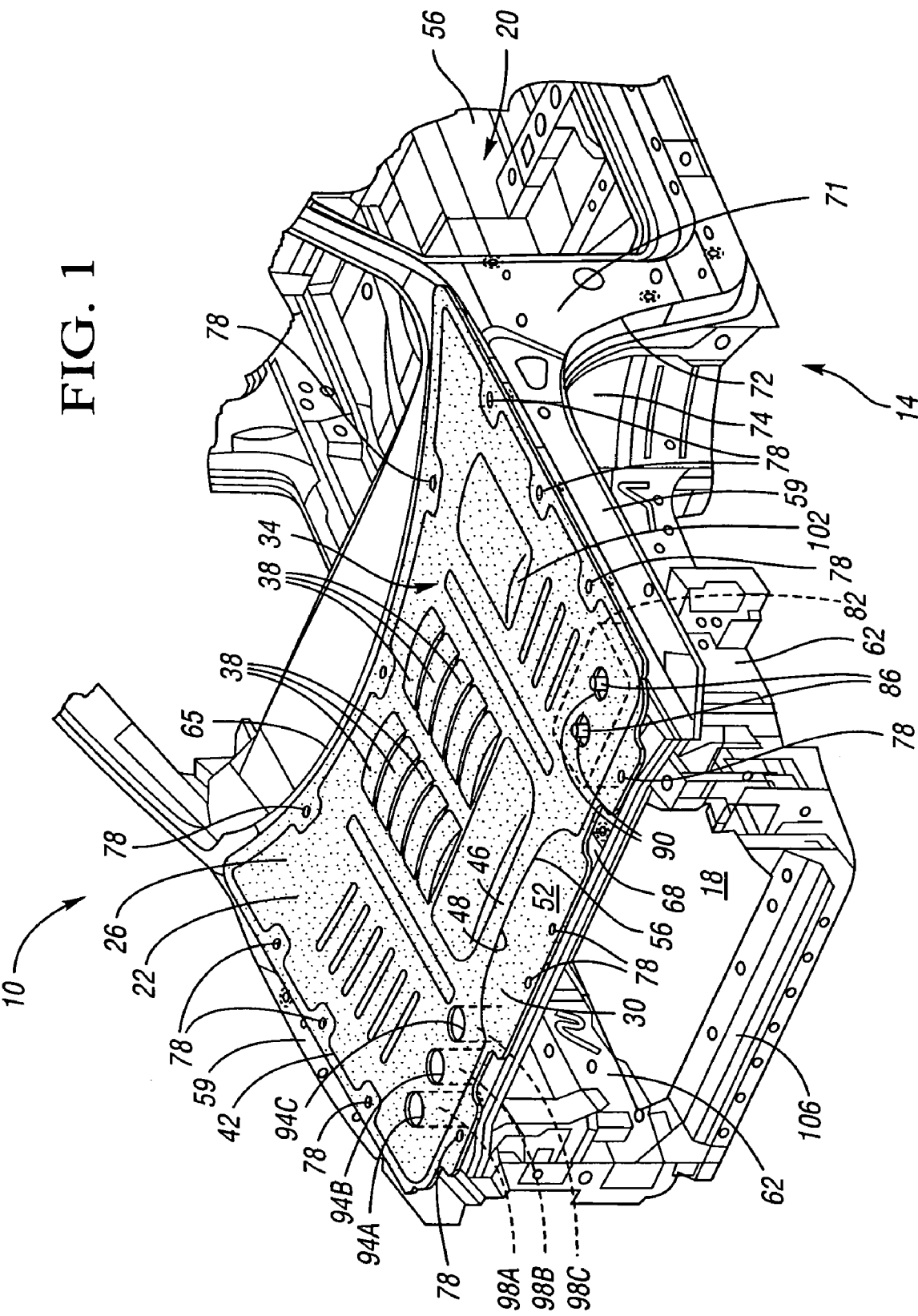
FIG. 1 is a schematic perspective view of a portion of a vehicle body and a load-bearing structural engine compartment cover.

Referring to FIG. 1, a vehicle 10 includes a vehicle body 14 that defines an engine compartment 18 forward of a passenger compartment 20. The vehicle 10 also includes an engine compartment cover 22 that extends over and above the engine compartment 18 to define at least a portion of the upper extent of the engine compartment. The engine compartment cover 22 includes is two-ply, i.e., the cover 22 includes two panels 26, 30 in juxtaposition with one another and operatively joined together. Panel 26 defines the upper surface 34 of the cover 22, which is characterized by aesthetic features such as contours 38. Panel 30 extends below panel 26, and the periphery 42 of panel 30 is hemmed around the periphery of panel 26.

A portion 46 of panel 26 is contoured such that the upper surface 34 at portion 46 is convex, with a corresponding concavity forming a channel 48 that opposes panel 30. The channel 48 cooperates with panel 30 to define an airflow passageway 52 having an opening 56 at the forward end of the engine compartment cover 22. The opening 56 of passageway 52 is in airflow communication with a vehicle grill (shown at 58 in FIG. 2) to receive airflow when the vehicle 10 is in motion. The channel 48 is configured to direct airflow as desired by the design of the vehicle for heat management of vehicular components, ventilation, etc.

The panels 26, 30 are preferably each one piece of metal and formed using sheet hydroforming, quick plastic forming, or superplastic forming; however, other forming techniques may be employed within the scope of the claimed invention. Quick plastic forming is described in U.S. Pat. No. 6,253,588, issued Jul. 3, 2001 to Rashid, et al, which is hereby incorporated by reference in its entirety. Superplastic forming is described in U.S. Pat. No. 5,974,847, issued Nov. 2, 1999 to Saunders, et al, which is hereby incorporated by reference in its entirety. Alternatively, and within the scope of the claimed invention, a cover 22 may be a single ply, i.e., formed by a single sheet.

The vehicle 10 also includes a vehicle frame, which may or may not be integral with the body 14 within the scope of the claimed invention. The vehicle frame has a plurality of structural load-bearing body frame members, including a pair of upper rails 59 that extend longitudinally with respect to the vehicle 10 and are spaced apart from one another;

mid-rails 62 (also sometimes referred to as "lower rails") that are situated lower than the upper rails, that extend longitudinally with respect to the vehicle 10, and are spaced apart from one another; cross members such as a cowl bar 65; an upper tie bar 68; front hinge pillars 71; and front wheelhouses 74 having shock towers (not shown).

The upper rails 59 extend from the front hinge pillars 71 forward to the upper tie bar 68. The upper tie bar 68 extends transversely and interconnects the forward ends of the upper rails 59. The cowl bar 65 extends substantially transversely and interconnects the rearward ends of the upper rails 59. The mid rails 62 are inboard of the upper rails 59 to accommodate wheels. Front wheelhouses 74 extend from the mid rails 62 to the upper rails 59. Shock towers house various suspension components (not shown).

The engine compartment 18 may include an engine (not shown), steering system components (not shown), braking system components (not shown), etc. The term "engine compartment" is non-limiting with respect to the nature or type of powerplant employed; thus, within the scope of the claimed invention, the vehicle 10 may employ any powerplant, such as a conventional internal combustion engine, an electric motor, a fuel cell, a hybrid-electric system, etc.

The engine compartment cover 22 is rigidly mounted with respect to each of the upper rails 59, cowl bar 65, and upper tie bar 68. In the context of the present invention, the engine compartment cover 22 is "rigidly mounted" with respect to a frame member if a connection or fastening device between the cover 22 and the frame member is configured to bear and transfer loads and moments between the cover 22 and the frame member irrespective of load vector. For example, the cover 22 would not be rigidly mounted to a frame member if the only locking or fastening element interjacent the cover 22 and the frame member is a hinge; by design, a hinge cannot support a moment, and the engine compartment cover 22 could pivot relative to the frame member.

Those skilled in the art will recognize a variety of rigid and releasable fasteners and fastening systems that may be employed within the scope of the claimed invention to rigidly connect the cover 22 to the frame members. In the embodiment depicted, the cover 22 defines a plurality of holes 78. Three holes 78 align with holes or clinch nuts (not shown) on one of the upper rails 59, three holes 78 align with holes or clinch nuts (not shown) on the other upper rail 59, three holes 78 align with holes or clinch nuts (not shown) on the upper tie bar 68, and three holes 78 align with holes or clinch nuts (not shown) on the cowl 65. Threaded fasteners (not shown) are inserted through holes 78 to engage the holes or clinch nuts on the frame members 59, 68, 65 to rigidly connect the cover 22 to each of frame members 59, 68, 65.

The loads borne by the frame members are smaller than those of conventional vehicles because the load-bearing engine compartment cover 22 distributes loads among the frame members. As a result, the frame members need not be as large or prominent as they are in the prior art. For example, the upper rails 59, cowl bar 65, and upper tie bar 68 may have an open section form, as opposed to a closed box form found in the prior art.

The cover 22 provides access points for various engine compartment components. More specifically, a battery 82 is located in the engine compartment 18, and includes two terminals 86. The cover 22 defines two apertures 90. Each aperture 90 is positioned to align with a corresponding one of the terminals 86 such that each terminal 86 extends through a corresponding one of the apertures 90. The cover 22 also defines three fluid-fill apertures 94A, 94B, 94C that align with the opening of a corresponding fluid conduit 98A, 98B, 98C, respectively, in the engine compartment. In the embodiment depicted, conduit 98A is in fluid communication with a windshield solvent reservoir (not shown); conduit 98B is in fluid communication with a radiator (not shown); and conduit 98C is in fluid communication with an engine crankcase (not shown). Removable plastic caps (not shown) may be employed to cover the apertures 94A, 94B, 94C.

In the embodiment depicted, the cover 22 also defines a storage pocket 102 formed between panels 26, 30 for storage of items such as a flashlight, a funnel for use with the fluid fill apertures, a jack, a squeegee, etc.

Alternatively, and within the scope of the claimed invention, the cover may be rigidly connected to the two mid-rails 62 and a lower cross-member 106 that interconnects the forward ends of the mid-rails 62 such that the cover defines at least a portion of the lower extent of the engine compartment thereby to function as a belly pan.

Figure 2:
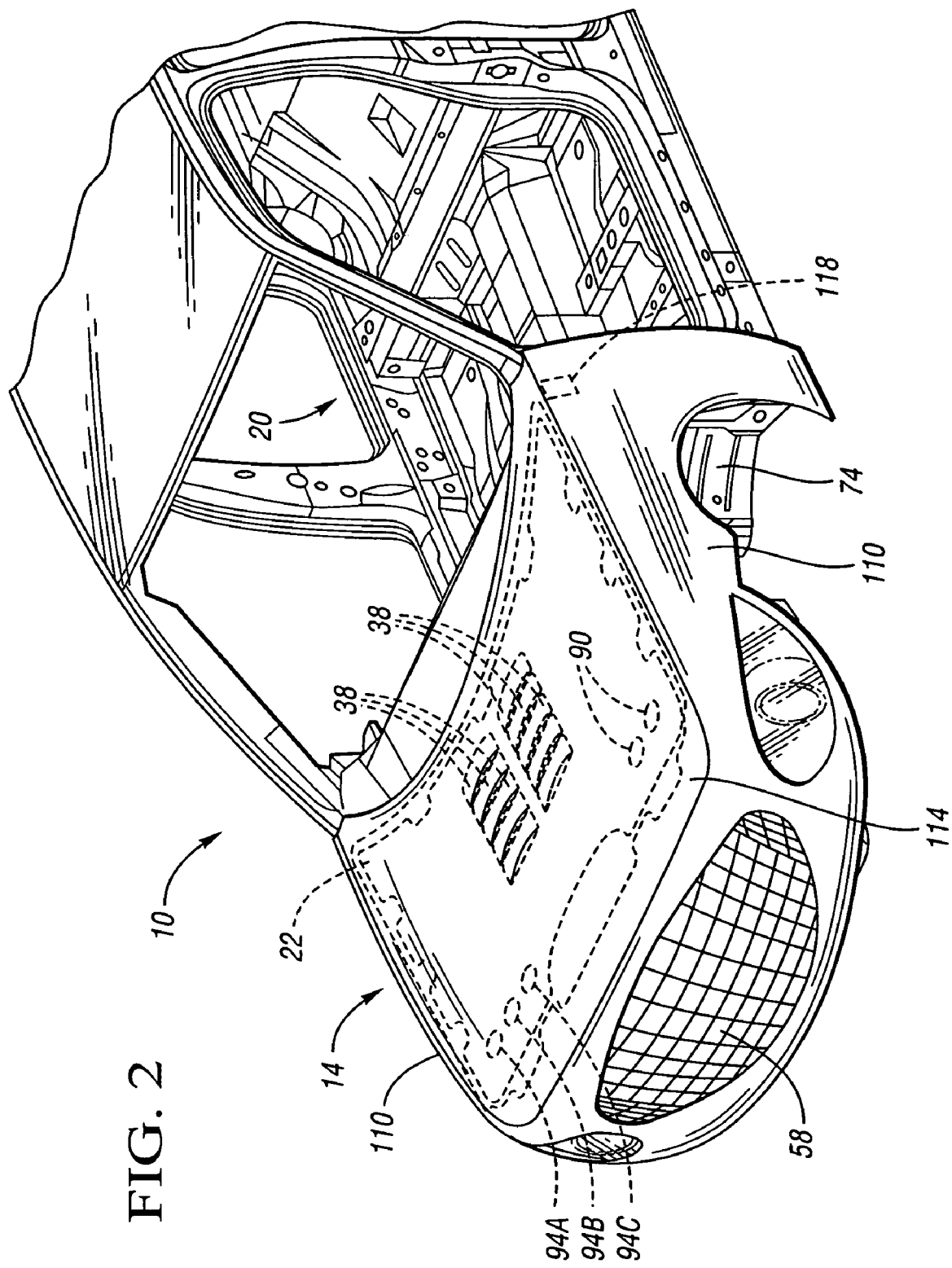
FIG. 2 is a schematic perspective view of the vehicle body of FIG. 1 with a hood installed over the load-bearing structural engine compartment cover.

Referring to FIG. 2, wherein like reference numbers refer to like components from FIG. 1, the vehicle body 14 is shown with fenders 110 attached to the upper rails (shown at 59 in FIG. 1). A hood 114 is pivotably connected to the upper rails or the cowl via hinges 118 for movement between a closed position, as shown in FIG. 2, and an open position in which the hood 114 is pivoted about the hinges 118. In the closed position, the hood 114 extends above and across the entire engine compartment and engine compartment cover 22, such that the hood is in juxtaposition with the cover 22.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the scope of the invention within the scope of the appended claims.

The invention claimed is:

1. A vehicle comprising:
   a vehicle body at least partially defining an engine compartment;
   a vehicle frame having a plurality of frame members, including at least one cross member and at least two rails mounted with respect to said at least one cross member;
   an engine compartment cover extending over and above at least a portion of the engine compartment and defining a panel rigidly mounted to at least two frame members of said plurality of frame members by a plurality of fasteners respectively along opposed sides of said panel to fasten said engine compartment cover to said at least two frame members so that the engine compartment cover is configured to transfer loads between said at least two frame members irrespective of load vector and thereby forms a portion of the vehicle frame by structurally interconnecting said at least two frame members; and
   a hood pivotably connected to the vehicle body for selective movement between an open position and a closed position in which the hood extends over the engine compartment and the engine compartment cover.

2. The vehicle of claim 1, wherein the engine compartment cover defines an upper surface characterized by contours.

3. The vehicle of claim 1, further comprising a conduit being at least partially located within the engine compartment; and wherein the engine compartment cover defines an aperture aligned with the conduit.

4. The vehicle of claim 1, further comprising a battery having a plurality of terminals, and wherein the engine compartment cover defines an aperture through which one of said terminals extends.

5. The vehicle of claim 1, wherein the engine compartment cover defines an airflow passageway.

6. The vehicle of claim 1, wherein the engine compartment cover defines a storage pocket.

7. The vehicle of claim 1, wherein the vehicle frame includes two upper rails, a front tie bar, and a cowl; and wherein the engine compartment cover is rigidly connected to at least two of the upper rails, the front tie bar, and the cowl.

8. The vehicle of claim 1, wherein the engine compartment cover includes formations caused by exposure to fluid pressure.

9. An engine compartment cover for an automotive vehicle having an engine compartment and a plurality of frame members, the cover comprising:

at least one panel being sufficiently sized to interconnect at least two of the plurality of frame members and thereby define at least a portion of the engine compartment; and a plurality of fastening elements on said at least one panel at which said at least one panel is rigidly connectable to said at least two of the plurality of frame members such that said at least one panel is configured to transmit loads between said at least two of the plurality of frame members irrespective of load vectors;

wherein said at least one panel includes a first panel and a second panel that cooperate to define an airflow passageway therebetween.

10. The engine compartment cover of claim 9, wherein said at least one panel defines an upper surface characterized by contours.

11. The engine compartment cover of claim 9, wherein said at least one panel defines a storage pocket.

12. The engine compartment cover of claim 9, wherein said at least one panel includes formations caused by exposure to fluid pressure.

13. A vehicle comprising:

a vehicle body at least partially defining an engine compartment;

a vehicle frame having a plurality of frame members, including at least one cross member and at least two rails mounted with respect to said at least one cross member;

a conduit being at least partially located within the engine compartment;

an engine compartment cover defining at least a portion of the engine compartment and being rigidly mounted to at least two frame members of said plurality of frame members so that the engine compartment cover is configured to transfer loads between said at least two frame members irrespective of load vector and thereby forms a portion of the vehicle frame by structurally interconnecting said at least two frame members;

a hood pivotably connected to the vehicle body for selective movement between an open position and a closed position in which the hood extends over the engine compartment and the engine compartment cover;

wherein the engine compartment cover defines an upper surface characterized by contours; and wherein the engine compartment cover defines an aperture aligned with the conduit.

14. A vehicle comprising:

a vehicle body at least partially defining an engine compartment;

a vehicle frame having a plurality of frame members, including at least one cross member and at least two rails mounted with respect to said at least one cross member;

an engine compartment cover extending over and above at least a portion of the engine compartment and defining a panel rigidly mounted to at least two frame members of said plurality of frame members along opposed sides of said panel to fasten said engine compartment cover to said at least two frame members so that the engine compartment cover is configured to transfer loads between said at least two frame members irrespective of load vector and thereby forms a portion of the vehicle frame by structurally interconnecting said at least two frame members; and a hood pivotably connected to the vehicle body for selective movement between an open position and a closed position in which the hood extends over the engine compartment and the engine compartment cover.

* * * * *